United States Patent
Lepper

(10) Patent No.: US 9,771,963 B2
(45) Date of Patent: Sep. 26, 2017

(54) SNAP-IN FASTENER WITH SEALING FLANGE

(71) Applicant: ILLINOIS TOOL WORKS INC., Glenview, IL (US)

(72) Inventor: Mark O. Lepper, Oak Park, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 41 days.

(21) Appl. No.: 14/401,137

(22) PCT Filed: May 21, 2013

(86) PCT No.: PCT/US2013/041940
§ 371 (c)(1),
(2) Date: Nov. 14, 2014

(87) PCT Pub. No.: WO2013/177108
PCT Pub. Date: Nov. 28, 2013

(65) Prior Publication Data
US 2015/0128386 A1    May 14, 2015

Related U.S. Application Data

(60) Provisional application No. 61/649,710, filed on May 21, 2012.

(51) Int. Cl.
*F16B 13/04* (2006.01)
*B29C 65/66* (2006.01)
(Continued)

(52) U.S. Cl.
CPC ............ *F16B 13/045* (2013.01); *B29C 65/66* (2013.01); *F16B 5/0657* (2013.01);
(Continued)

(58) Field of Classification Search
CPC ... B29C 63/42; B29C 65/66; B29C 66/73715; F16B 13/045; F16B 13/128;
(Continued)

(56) References Cited

U.S. PATENT DOCUMENTS 3,203,304 A * 8/1965 Rapata .................... E05B 79/12
277/637
3,357,064 A * 12/1967 Munse .................... F16B 5/128
24/291

(Continued)

FOREIGN PATENT DOCUMENTS

EP    1895171 A2    3/2008
ES    2127062 A1    4/1999

OTHER PUBLICATIONS

ISR and WO for PCT/US2013/041940 dated Sep. 12, 2013.

*Primary Examiner* — David Upchurch
(74) *Attorney, Agent, or Firm* — Paul F. Donovan

(57) ABSTRACT

An improved fastener with an annular sealing flange disposed above a lead-in base clip portion adapted for insertion into an acceptance opening in a panel or other structure. A heat-shrunk seal is disposed about the perimeter of the annular sealing flange in partial covering relation to upper and lower surfaces of the annular sealing flange to provide an enhanced sealing relation between the sealing flange and the panel.

18 Claims, 3 Drawing Sheets

(51) Int. Cl.
*F16B 5/06* (2006.01)
*F16B 21/08* (2006.01)
*F16B 13/12* (2006.01)
*B29C 63/42* (2006.01)
*F16B 13/00* (2006.01)
*B29C 65/00* (2006.01)

(52) U.S. Cl.
CPC .......... *F16B 13/128* (2013.01); *F16B 21/086* (2013.01); *B29C 63/42* (2013.01); *B29C 66/73715* (2013.01); *F16B 2013/006* (2013.01); *Y10T 24/44026* (2015.01); *Y10T 29/49876* (2015.01)

(58) Field of Classification Search
CPC  F16B 2013/006; F16B 21/086; F16B 5/0657; F16B 19/008
USPC .................... 24/297, 453, 458; 411/508
See application file for complete search history.

(56) References Cited

U.S. PATENT DOCUMENTS

| | | | | |
|---|---|---|---|---|
| 3,644,965 A | * | 2/1972 | Kahn | A44B 1/28 24/108 |
| 3,788,185 A | * | 1/1974 | Gutshall | F16B 35/06 411/369 |
| 3,835,906 A | * | 9/1974 | Dietlein | F16B 39/284 29/447 |
| 3,882,752 A | * | 5/1975 | Gutshall | F16B 35/06 411/369 |
| 4,242,939 A | * | 1/1981 | Osborne | F16B 19/1081 411/41 |
| 4,361,997 A | * | 12/1982 | DeCaro | E04D 3/3603 411/161 |
| 5,173,026 A | * | 12/1992 | Cordola | F16B 5/065 24/297 |
| 5,301,396 A | | 4/1994 | Benoit | |
| 5,513,603 A | * | 5/1996 | Ang | F02F 7/006 123/198 E |
| 6,715,185 B2 | | 4/2004 | Angellotti | |
| 6,752,950 B2 | | 6/2004 | Clarke | |
| 7,017,239 B2 | | 3/2006 | Kurily et al. | |
| 7,152,281 B2 | | 12/2006 | Scroggie | |
| 7,481,474 B2 | * | 1/2009 | Higgins | F16B 21/086 24/292 |
| 8,561,265 B2 | * | 10/2013 | Benedetti | F16B 21/086 24/297 |
| 2002/0063436 A1 | * | 5/2002 | Dendo | B60N 3/066 296/75 |
| 2003/0159256 A1 | * | 8/2003 | Clarke | F16B 19/008 24/297 |
| 2006/0099051 A1 | | 5/2006 | Moerke | |
| 2006/0267381 A1 | * | 11/2006 | Cave | B60R 13/0206 296/209 |
| 2008/0052878 A1 | | 3/2008 | Lewis et al. | |
| 2009/0191061 A1 | * | 7/2009 | Lacey | F04D 1/06 416/214 R |
| 2009/0252573 A1 | * | 10/2009 | Nakazato | F16B 21/086 411/510 |
| 2010/0146883 A1 | * | 6/2010 | Benkel | E06B 3/6675 52/204.64 |
| 2011/0278760 A1 | * | 11/2011 | Lewis | F16B 5/065 264/259 |
| 2012/0131773 A1 | * | 5/2012 | DeGelis | F16B 21/086 24/604 |
| 2012/0317757 A1 | | 12/2012 | Risdale et al. | |
| 2013/0228979 A1 | * | 9/2013 | Griffiths | F02F 7/00 277/591 |
| 2013/0309040 A1 | * | 11/2013 | Phillips | C08L 33/08 411/82 |

* cited by examiner

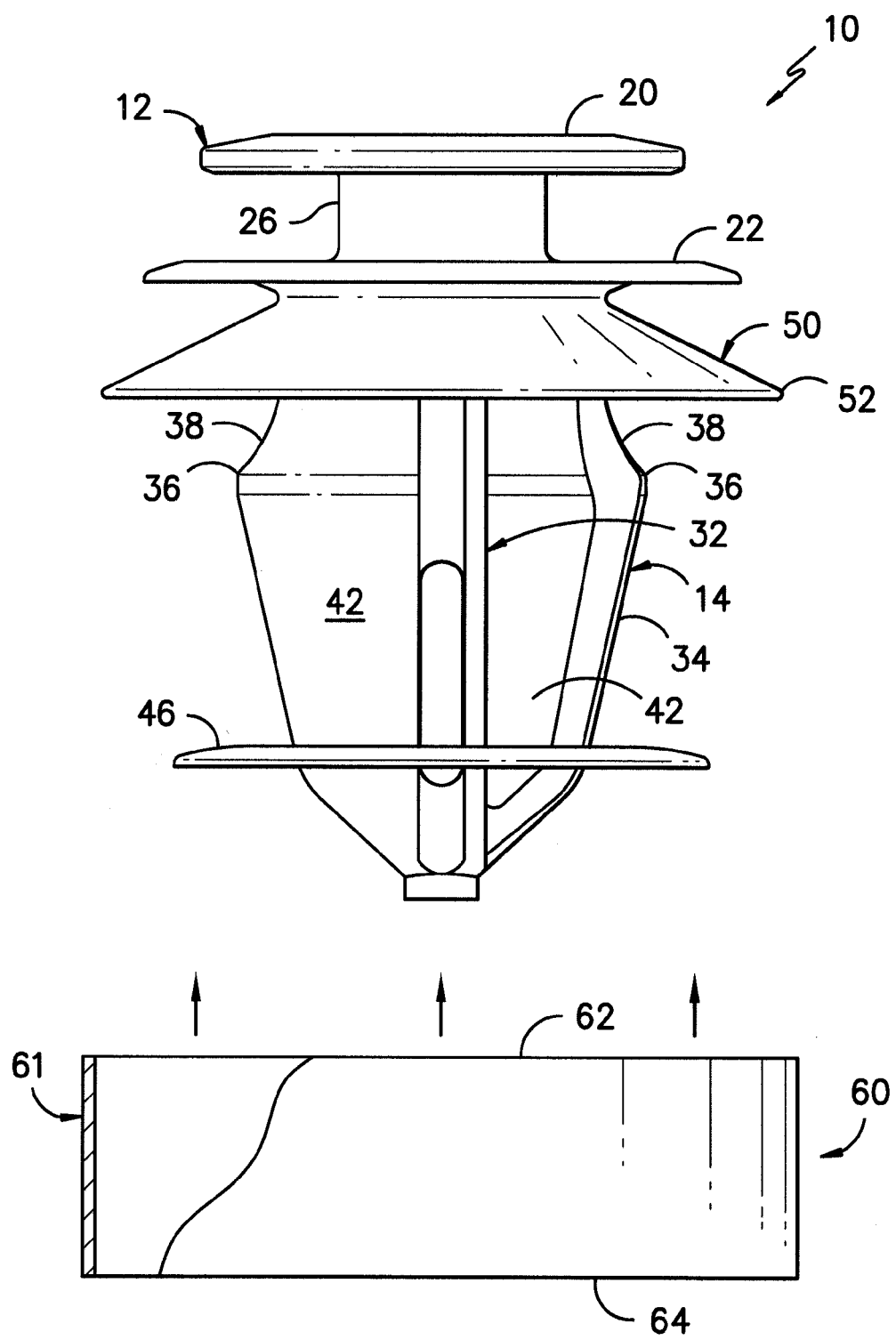
FIG. -1-

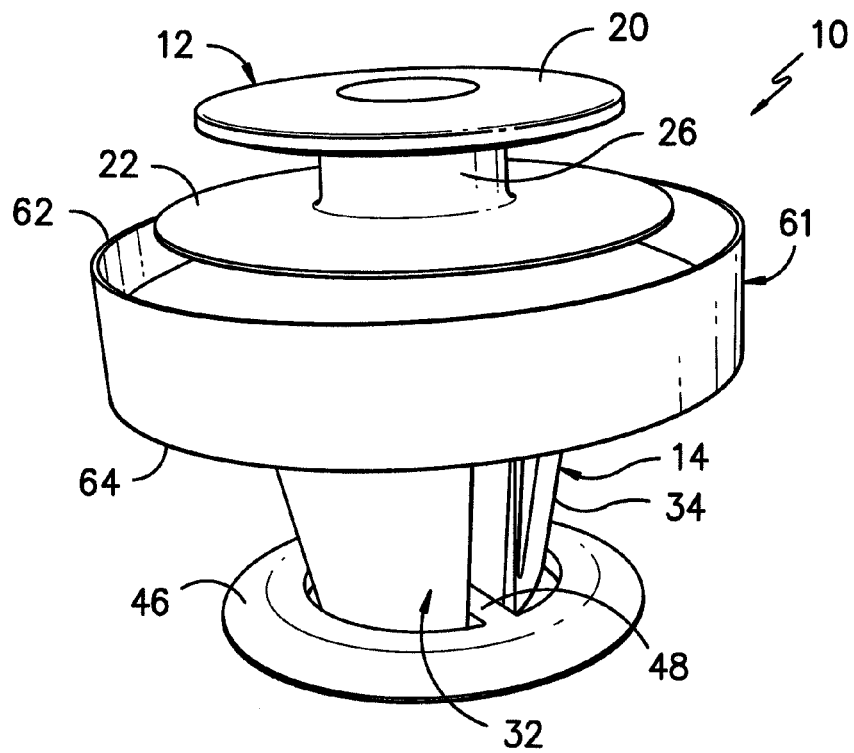
FIG. -2-
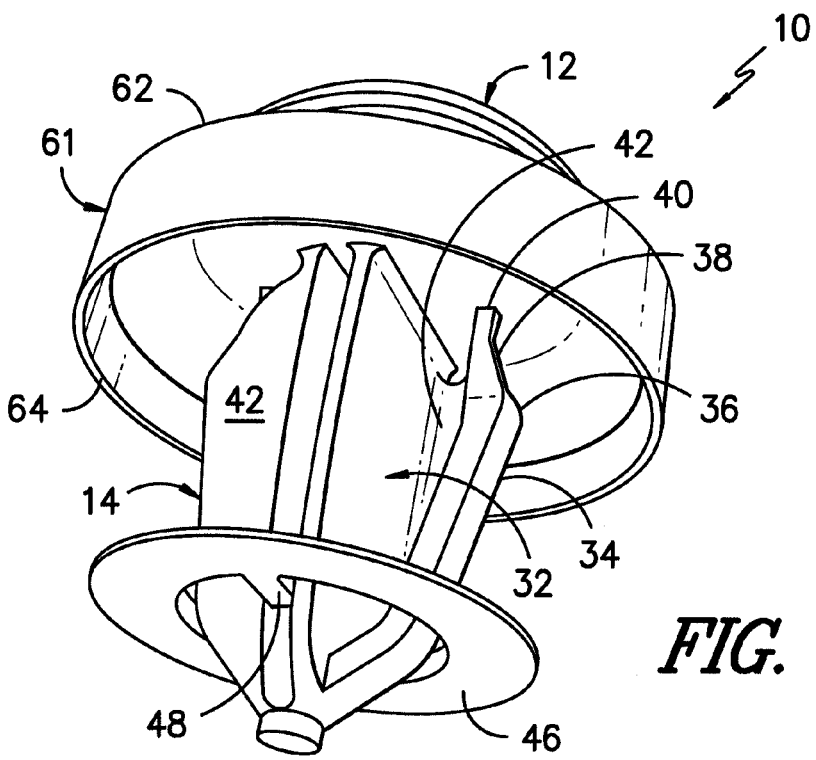
FIG. -3-

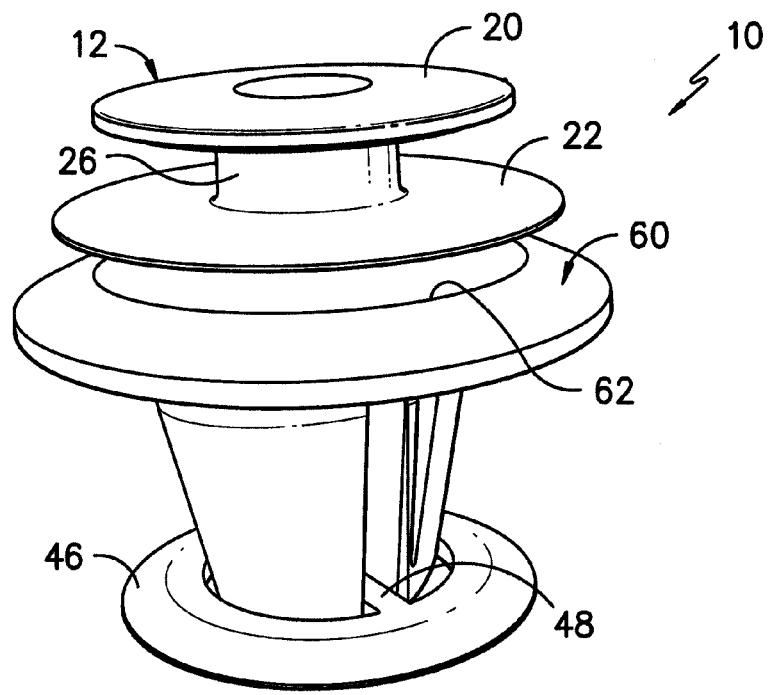
FIG. -4-
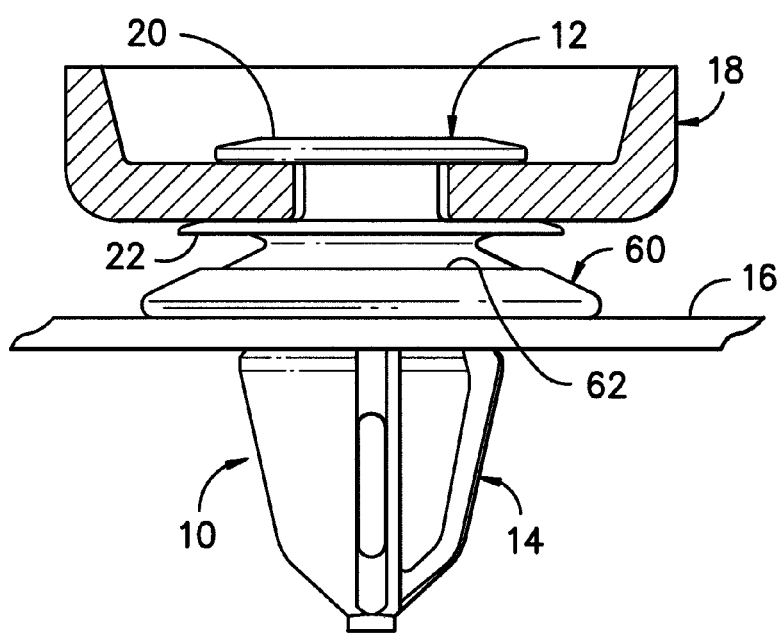
FIG. -5-

SNAP-IN FASTENER WITH SEALING FLANGE

CROSS-REFERENCE TO RELATED APPLICATION

This application is a national phase of International Application Number PCT/US2013/041940 filed May 21, 2013 and claims the benefit of, and priority from, U.S. Provisional Application 61/649,710 filed May 21, 2012, the contents of which are hereby incorporated by reference in their entirety as if fully set forth herein.

TECHNICAL FIELD

The present disclosure relates generally to fasteners used as intermediate connectors between a first component and a second component disposed in juxtaposed relation to one another. More particularly, the present disclosure relates to a push-through fastener including a head portion adapted to operatively engage a piece of trim, doghouse connector or the like and a base clip portion extending away from the head portion and adapted for press-fit insertion into an access opening of an underlying support element such as a panel or other structure. A sealing flange is disposed circumferentially about the fastener at a position generally between the base clip portion and the head portion to engage the panel or other structure in sealing relation about the access opening.

BACKGROUND OF THE DISCLOSURE

It is known to use snap-in fasteners to connect panels or other structures in opposing relation to one another. A number of prior connection devices and techniques are known and disclosed in the art. By way of example only, and not limitation, these include the connection devices and techniques disclosed in U.S. Patent Application 20120317757A1 to Risdale et al., and U.S. Pat. No. 6,715,185 to Angellotti; U.S. Pat. No. 6,752,950 to Clarke; U.S. Pat. No. 7,017,239 to Kurily et al.; and U.S. Pat. No. 7,152,281 to Scroggie, the teachings of all of which are incorporated by reference in their entirety as if fully set forth herein. Such fasteners typically include a "W" base clip or other snap-in element that is inserted into an acceptance opening in a primary support panel such as sheet metal forming a structural portion of a vehicle, appliance or the like. Such fasteners also include a head portion that is mounted at a secondary panel or other structure such as a piece of trim or the like. In some environments of use, the head portion may be secured within an intermediate doghouse structure disposed at a surface of the secondary panel which is oriented in facing relation to the primary support structure. The head portion also may be held directly to the secondary panel by adhesive bonding using tape or the like. Of course, other connection techniques may likewise be used. Thus, the fastener may provide an operative connection between the primary support structure and the secondary panel or other structure.

In some past constructions, the snap-in fasteners have been of unitary construction formed from techniques such as injection molding or the like. Such unitary constructions have performed well and have the benefit of being formed in a single molding operation. As will be appreciated, the polymeric materials forming the molded fasteners may tend to have a degree of rigidity to provide structural integrity during use. However, such rigidity may reduce the ability to provide a seal around the access opening. Accordingly, it has been common to use an annular gasket of foam rubber or other material to promote effective fluid sealing around the fastener acceptance opening.

SUMMARY OF THE DISCLOSURE

The present disclosure provides advantages and alternatives over the prior art by providing an improved fastener with a radial sealing flange (flat or umbrella) disposed above a lead-in base clip portion adapted for insertion into an acceptance opening in a panel or other structure. A heat-shrunk seal is disposed about the perimeter of the sealing flange in partial covering relation to upper and lower surfaces of the sealing flange to provide an enhanced sealing relation between the flange and the panel. As the fastener is pressed inwardly through an acceptance opening in the panel, the sealing flange is urged against the upper surface of the panel in surrounding relation to the acceptance opening. The heat shrunk seal at the perimeter of the sealing flange forms a sealing relation about the acceptance opening to prevent fluid leakage.

In accordance with one exemplary aspect, the present disclosure provides a fastener adapted to join a first structure to a second structure. The fastener includes a base clip portion of a molded polymer adapted for snap-fit insertion into an acceptance opening in the first structure. The base clip portion includes one or more compressible wing elements adapted to snap behind a lower surface of the first structure upon insertion of the base clip portion into the acceptance opening. The fastener further includes a head portion of the molded polymer formed integrally with the base clip portion. The head portion is adapted for operative connection to the second structure for disposition in opposing relation to the first structure. A radial sealing flange of rigid or flexible character extends radially away from the head portion to a perimeter edge at a position above the wing elements. A seal of heat shrunk polymer is disposed in substantially continuous covering relation about the perimeter edge. The seal is adapted to contact an upper surface of the first structure to define a compressible barrier to liquid flow between the seal and the upper surface of the first structure upon insertion of the base clip portion into the acceptance opening.

A method of forming a fastener consistent with the present disclosure is also provided. Other exemplary aspects and features will become apparent upon review of the following detailed description of potentially preferred embodiments and accompanying drawings.

BRIEF DESCRIPTION OF THE DRAWINGS

FIG. 1 is a schematic assembly view of an exemplary panel fastener and a tubular heat-shrinkable sealing element consistent with the present disclosure;

FIG. 2 is a schematic side view of an intermediate assembly of the exemplary panel fastener of FIG. 1 with the tubular sealing element in position prior to shrinkage;

FIG. 3 is a lower elevation perspective view of the intermediate assembly of FIG. 2;

FIG. 4 is a schematic side view similar to FIG. 2 with the tubular sealing element in heat shrunk attachment about the perimeter of the fastener sealing flange; and FIG. 5 illustrates an exemplary panel fastener consistent with the present disclosure in connecting relation between a panel and a doghouse structure.

Before the exemplary embodiments of the disclosure are explained in detail, it is to be understood that the disclosure is in no way limited in its application or construction to the details and the arrangements of the components set forth in the following description or illustrated in the drawings. Rather, the disclosure is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Reference will now be made to the drawings wherein to the extent possible, like elements are designated by like reference numerals in the various views. As shown in FIG. 1, an exemplary snap-in fastener 10 (also referred to as a "retainer") includes a head portion 12 and a base clip portion 14 projecting axially away from the head portion 12. As best seen in FIG. 5, during use the base clip portion 14 is held in locked relation within an opening in a primary structure 16 such as a structural panel of sheet metal, plastic or the like. The head portion 12 is adapted to be held at a secondary structure 18 such as a doghouse connector or slot opening in a piece of trim or the like in a manner as will be well known to those of skill in the art. Thus, the primary structure 16 and the secondary structure 18 are held in a fixed juxtaposed relation relative to one another.

As seen in FIG. 1, in the illustrated exemplary construction, the head portion 12 may include a first circumferential flange 20 in spaced-apart relation to a second circumferential flange 22. In the illustrated exemplary construction, the head portion 12 includes a rear axial pillar 26 which runs in intersecting relation through the first circumferential flange 20 and the second circumferential flange 22. The rear axial pillar 26 may be substantially cylindrical, although other geometries may likewise be used if desired. In accordance with one contemplated exemplary practice, the rear axial pillar 26 may be integral with other portions of the head portion 12 and is formed such that the first circumferential flange 20 and second circumferential flange 22 are normally disposed in at least partial surrounding relation to portions of the rear axial pillar 26. As will be appreciated, the spacing between the first circumferential flange 20 and second circumferential flange 22 defines a gap for sliding attachment of the secondary structure 18 during use such that the rear axial pillar is held within an acceptance slot in the secondary structure 18 (FIG. 5).

As best seen through joint reference to FIGS. 1, 3 and 5, the base clip portion 14 of the fastener 10 is adapted for press-fit insertion into an opening in the primary structure 16. In the illustrated exemplary construction, the base clip portion 14 may have a central support 32 and a pair of angled wing elements 34 (only one shown) extending away from opposite sides of the distal end the central support 32. As best seen in FIG. 3, the wing elements may have a generally dogleg geometry defining a radially outwardly protruding elbow 36 with a radially inwardly angled segment 38 defining a cradle disposed between the elbow 36 and a free end 40. As best seen in FIG. 3, each of the wing elements 34 may be attached to the central support 32 by a support wall 42 extending between the central support 32 and one lateral edge of the wing element. However, such a support wall may likewise be eliminated if desired. As best seen in FIG. 5, when the fastener 10 is fully inserted, the inwardly angled segments 38 will spring behind the underside of the panel or other primary structure 16 such that withdrawal of the fastener is blocked.

As shown, the fastener 10 may include a displaceable snap-out ring 46 disposed at the distal end of the base clip portion 14 prior to insertion into the acceptance opening in the primary structure 16. In this regard, the snap-out ring 46 may be attached to the central support 32 by an arrangement of break-away tabs 48 which fracture as the base clip portion 14 is pressed into an acceptance opening. As the insertion progresses, the snap-out ring then travels upwardly towards the head portion and over the outwardly protruding elbows 36 while compressing the wing elements radially inwardly until the insertion is complete and the wing elements 34 snap into place behind the panel or other primary structure 16. By way of example only, and not limitation, exemplary snap-out rings may be disclosed in U.S. Pat. No. 5,301,396 which is incorporated by reference as if fully set forth herein. Of course, the snap-out ring 46 may be eliminated if desired.

In the illustrated exemplary construction, the fastener 10 may also include an integral annular sealing flange 50 disposed below the lower circumferential flange 22. The annular sealing flange 50 is illustrated as having a generally umbrella-shape configuration with a convex upper surface and a concave lower surface. However, a substantially flat flange of annular geometry may likewise be used if desired. In the illustrated exemplary construction incorporating the annular sealing flange 50 of umbrella construction, a perimeter edge 52 defines the intersection between the convex upper surface and concave lower surface. In this regard, the annular sealing flange 50 may be either continuous or discontinuous about its circumference. As best seen in FIG. 5, when the fastener is inserted into an access opening, the annular sealing flange 50 will define a surface opposing the wing elements 34 to hold the primary structure 16 in place with the perimeter edge 52 bearing against the upper surface of the primary structure 16. As will be readily appreciated, in the event that the annular sealing flange is flat, rather than umbrella shaped, surfaces inboard from the perimeter edge 52 may likewise bear against the upper surface of the primary structure 16.

In accordance with one exemplary practice, the fastener 10 may be formed as a unitary structure by injection molding or other suitable techniques using suitable materials such as Nylon 6.6, polyester, acetal resin or the like with sufficient rigidity and strength to avoid undesired failure following insertion. Combinations of two or more materials which melt bond to one another may likewise be used. Thus, while a single material may be used, two or more materials may also be used.

As best seen through joint reference to FIGS. 1-3, a heat shrinkable seal 60 may be applied about the perimeter edge 52 of the annular sealing flange 50. In accordance with the illustrated exemplary practice, the seal 60 may be in the form of a hollow tubular sleeve segment 61 cut from a longer tube (not shown). As shown, the tubular sleeve segment 61 includes an upper edge 62 and a lower edge 64. The inner diameter of the tubular sleeve segment 61 is preferably substantially equal to or slightly greater than the outer diameter of the annular sealing flange 50 such that the tubular sleeve segment 61 may slide over the base clip portion 14 (including any snap-out ring) for disposition in surrounding relation about the perimeter edge 52 of the flange 50.

The tubular sleeve segment 61 may be formed from commercially available heat shrinkable material such as polyolefins, PVC, silicone rubber, PTFE, polyvinylidene fluoride (PVDF), fluorinated ethylene propylene (FEP) and blends thereof. Such materials will preferably be characterized by a useful operating temperature range after shrinkage of about −75° C. to about 175° C. with a shrinkage ratio of about 2 to 1, or greater and more preferably a shrinkage ratio of about 3 to 1.

As best illustrated through joint reference to FIGS. 2-5, with the tubular sleeve segment 61 in place about the perimeter edge 52 of the annular sealing flange 50, the application of heat such as in an oven with forced air convection or the like, will cause the tubular sleeve segment 61 to shrink in conformity about perimeter edge 52. In the final exemplary embodiment shown in FIGS. 4 and 5, the heat shrunk seal 60 is disposed continuously about the perimeter edge and extends radially inwardly from the perimeter edge 52 partially (but not completely) along the upper and lower surfaces of the annular sealing flange 50 towards the center axis. The seal 60 thus defines a relatively soft, deformable covering at the perimeter edge 52 contacting the upper surface of the panel or other primary structure 16 in surrounding relation to the access opening through which the fastener 10 is inserted.

It has been found that the inclusion of a heat shrunk seal 60 about the perimeter of an annular sealing flange 50 in a fastener 10 in accordance with the present disclosure provides significant resistance to fluid leakage around the fastener 10 following insertion. In this regard, a fastener 10 with such a heat shrunk seal was inserted through an access opening in a panel. An open ended cylinder was then placed over the fastener 10 in surrounding relation to the head portion and filled with water to a height of 100 mm. The underside of the panel was monitored for moisture, and no leakage was detected after 10 minutes thereby indicating seal integrity at a hydrostatic head of up to at least 100 mm water pressure or more.

Of course, variations and modifications of the foregoing are within the scope of the present disclosure. Thus, it is to be understood that the disclosure disclosed and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments and equivalents to the extent permitted by the prior art.

Various features of the disclosure are set forth in the following claims.

What is claimed is:

1. A method of forming a fastener adapted to join a first structure to a second structure, the method comprising the steps of:
   providing a fastener including a base clip portion of a molded polymer, a head portion of the molded polymer, and an annular sealing flange, the base clip portion including compressible wing elements adapted to snap behind a lower surface of the first structure upon insertion of the base clip portion into an acceptance opening in the first structure and the head portion being adapted for operative connection to the second structure for disposition in opposing relation to the first structure, the annular sealing flange extending radially away from the head portion to a perimeter edge at a position above the wing elements, and wherein the annular sealing flange has an umbrella shape with a convex upper surface and a concave lower surface;
   providing a straight sided cylindrical tubular sleeve segment of a heat shrinkable polymer, said straight sided cylindrical tubular sleeve segment having an inner diameter greater than an outer diameter of the annular sealing flange;
   positioning the straight sided cylindrical tubular sleeve segment in circumferentially surrounding relation about the perimeter edge about the perimeter edge of the annular sealing flange such that an upper edge of the straight sided cylindrical tubular sleeve segment is disposed at an elevation above the perimeter edge of the annular sealing flange and a lower edge of the straight sided cylindrical tubular sleeve segment is disposed at an elevation below the perimeter edge of the annular sealing flange; and
   applying heat to the cylindrical tubular sleeve segment following the positioning step to cause the heat shrinkable polymer to form a seal of heat shrunk polymer disposed in substantially continuous heat shrunken covering relation in conformity about the perimeter edge of the annular sealing flange and extending radially inwardly from the perimeter edge partially along the convex upper surface and the concave lower surface of the annular sealing flange, the seal being adapted to contact an upper surface of the first structure to define a compressible barrier to liquid flow between the seal and the upper surface of the first structure upon insertion of the base clip portion into the acceptance opening such that the seal blocks liquid flow between the seal and the upper surface of the first structure when exposed to a hydrostatic head of 100 mm water pressure.

2. The method as recited in claim 1, wherein the molded polymer is selected from the group consisting of Nylon 6.6, and acetal resin.

3. The method as recited in claim 1, wherein the heat shrinkable polymer is selected from the group consisting of polyolefins, PVC, silicone rubber, PTFE, polyvinylidene fluoride, fluorinated ethylene propylene and blends thereof.

4. The method as recited in claim 1, wherein the molded polymer is Nylon 6.6, and the heat shrinkable polymer is a polyolefin.

5. The method as recited in claim 1, wherein the molded polymer is acetal resin and the heat shrinkable polymer is a polyolefin.

6. The method as recited in claim 1, wherein a displaceable, annular snap-out ring is releasably affixed about the base clip portion at a position below the annular sealing flange.

7. The method as recited in claim 6, wherein the wing elements have a dog-leg configuration including a radially outwardly protruding elbow with a radially inwardly angled segment defining a cradle disposed between the elbow and a free end.

8. The method as recited in claim 1, wherein the head portion includes an axial pillar extending in spacing relation between a first circumferential flange and a second circumferential flange at a position above the annular sealing flange, and wherein the space between the first circumferential flange and the second circumferential flange is adapted to slidingly receive a portion of the secondary structure such that the axial pillar fits within a slot in the secondary structure.

9. The method as recited in claim 1, wherein the molded polymer and the heat shrunk polymer cylindrical tubular sleeve are different materials.

10. A method of forming a fastener adapted to join a first structure to a second structure, the method comprising the steps of:
    providing a fastener including a base clip portion of a molded polymer, a head portion of the molded polymer, and an annular sealing flange, the base clip portion including compressible wing elements adapted to snap behind a lower surface of the first structure upon insertion of the base clip portion into an acceptance opening in the first structure and the head portion being adapted for operative connection to the second structure for disposition in opposing relation to the first structure, the annular sealing flange extending radially away from the head portion to a perimeter edge at a position above the wing elements, and wherein the annular sealing flange has an umbrella shape with a convex upper surface and a concave lower surface;
    providing a straight sided cylindrical tubular sleeve segment of a heat shrinkable polymer of substantially uniform thickness, said straight sided cylindrical tubular sleeve segment having an inner diameter greater than an outer diameter of the annular sealing flange;
    positioning the straight sided cylindrical tubular sleeve segment in circumferentially surrounding relation about the perimeter edge of the annular sealing flange such that an upper edge of the straight sided cylindrical tubular sleeve segment is disposed at an elevation above the perimeter edge of the annular sealing flange and a lower edge of the straight sided cylindrical tubular sleeve segment is disposed at an elevation below the perimeter edge of the annular sealing flange; and
    applying heat to the cylindrical tubular sleeve segment following the positioning step to cause the heat shrinkable polymer to form a seal of heat shrunk polymer disposed in substantially continuous heat shrunken covering relation in conformity about the perimeter edge of the annular sealing flange and extending radially inwardly from the perimeter edge partially, but not completely, along the convex upper surface and the concave lower surface of the annular sealing flange to define a wrap-around covering layer having a shrunken shape profile corresponding to the perimeter edge, the seal being adapted to contact an upper surface of the first structure to define a compressible barrier to liquid flow between the seal and the upper surface of the first structure upon insertion of the base clip portion into the acceptance opening such that the seal blocks liquid flow between the seal and the upper surface of the first structure when exposed to a hydrostatic head of 100 mm water pressure.

11. The method as recited in claim 10, wherein the molded polymer is selected from the group consisting of Nylon 6.6, and acetal resin.

12. The method as recited in claim 10, wherein the heat shrinkable polymer is selected from the group consisting of polyolefins, PVC, silicone rubber, PTFE, polyvinylidene fluoride, fluorinated ethylene propylene and blends thereof.

13. The method as recited in claim 10, wherein the molded polymer is Nylon 6.6, and the heat shrinkable polymer is a polyolefin.

14. The method as recited in claim 10, wherein the molded polymer is acetal resin and the heat shrinkable polymer is a polyolefin.

15. The method as recited in claim 10, wherein a displaceable, annular snap-out ring is releasably affixed about the base clip portion at a position below the annular sealing flange.

16. The method as recited in claim 15, wherein the wing elements have a dog-leg configuration including a radially outwardly protruding elbow with a radially inwardly angled segment defining a cradle disposed between the elbow and a free end.

17. The method as recited in claim 10, wherein the head portion includes an axial pillar extending in spacing relation between a first circumferential flange and a second circumferential flange at a position above the annular sealing flange, and wherein the space between the first circumferential flange and the second circumferential flange is adapted to slidingly receive a portion of the secondary structure such that the axial pillar fits within a slot in the secondary structure.

18. The method as recited in claim 10, wherein the molded polymer and the heat shrunk polymer cylindrical tubular sleeve are different materials.

\* \* \* \* \*